United States Patent
Johnson, Sr.

(10) Patent No.: US 8,736,286 B2
(45) Date of Patent: *May 27, 2014

(54) MECHANISMS FOR DETECTING TAMPERING OF AN ELECTRONIC DEVICE

(75) Inventor: Timothy M. Johnson, Sr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/602,017

(22) Filed: Aug. 31, 2012

(65) Prior Publication Data

US 2013/0082721 A1   Apr. 4, 2013

Related U.S. Application Data

(63) Continuation of application No. 12/721,211, filed on Mar. 10, 2010, now Pat. No. 8,278,948.

(60) Provisional application No. 61/232,686, filed on Aug. 10, 2009.

(51) Int. Cl.
| | |
|---|---|
| *G01R 27/08* | (2006.01) |
| *G01R 31/04* | (2006.01) |
| *G08B 13/00* | (2006.01) |

(52) U.S. Cl.
USPC ........ 324/691; 324/538; 340/541; 340/568.1; 340/568.2

(58) Field of Classification Search
USPC ..................... 324/691, 538; 340/539.31, 541, 340/568.1–568.4
See application file for complete search history.

(56) References Cited

U.S. PATENT DOCUMENTS

| | | | |
|---|---|---|---|
| 4,942,364 | A | 7/1990 | Nishijima et al. |
| 5,541,578 | A | 7/1996 | Lussey |
| 5,991,164 | A | 11/1999 | Saito et al. |
| 6,177,342 | B1 | 1/2001 | Lee et al. |
| 6,421,013 | B1 | 7/2002 | Chung |
| 6,603,319 | B1 | 8/2003 | Kasahara et al. |
| 6,606,252 | B1 | 8/2003 | Snider |

(Continued)

FOREIGN PATENT DOCUMENTS

| | | |
|---|---|---|
| EP | 0969346 A2 | 5/2000 |
| EP | 2465102 | 6/2012 |

(Continued)

OTHER PUBLICATIONS

European Application No. 10740077.2—Notice of Publication mailed May 23, 2012.

(Continued)

*Primary Examiner* — Arleen M Vasquez
*Assistant Examiner* — Son Le
(74) *Attorney, Agent, or Firm* — Womble Carlyle Sandridge & Rice LLP

(57) ABSTRACT

An electronic device has a chassis, and a printed wiring board (PWB) having a hole. A fastener is installed in the hole thereby securing the PWB to the chassis. A pair of conductive traces is formed in the PWB. A cap, being an amount of conductive glue, covers a part of the fastener and fills an electrically insulating gap between the two traces, to thereby form a conductive path that connects the two traces. A sensing circuit is coupled to the traces, to detect a change in impedance of the path and signal a tamper event alert. Other embodiments are also described and claimed.

17 Claims, 7 Drawing Sheets

(56) References Cited

U.S. PATENT DOCUMENTS

| | | |
|---|---|---|
| 6,888,502 B2 | 5/2005 | Beigel et al. |
| 7,022,929 B1 | 4/2006 | Snider |
| 7,098,792 B1 | 8/2006 | Ahlf et al. |
| 7,493,690 B2 | 2/2009 | Muto et al. |
| 7,535,356 B2 | 5/2009 | Lerch et al. |
| 7,541,939 B2 | 6/2009 | Zadesky et al. |
| 8,278,948 B2 * | 10/2012 | Johnson ................ 324/691 |
| 2006/0005996 A1 | 1/2006 | Muto et al. |
| 2006/0032761 A1 | 2/2006 | Oguri |
| 2006/0184379 A1 | 8/2006 | Tan et al. |
| 2008/0191174 A1 | 8/2008 | Ehrensvard et al. |
| 2008/0284610 A1 | 11/2008 | Hunter |
| 2009/0195394 A1 | 8/2009 | Johnson et al. |
| 2009/0212945 A1 | 8/2009 | Steen |
| 2009/0232686 A1 | 9/2009 | Ay et al. |
| 2009/0309074 A1 | 12/2009 | Chen et al. |
| 2010/0012733 A1 | 1/2010 | Lerch et al. |
| 2010/0290200 A1 | 11/2010 | Yamamoto et al. |
| 2013/0082721 A1 | 4/2013 | Johnson |

FOREIGN PATENT DOCUMENTS

| | | |
|---|---|---|
| GB | 2 303 173 A | 2/1997 |
| WO | 01/63994 A2 | 8/2001 |
| WO | 2006/092591 A1 | 8/2006 |
| WO | WO 20060092591 | 9/2006 |
| WO | 2009/115131 A1 | 9/2009 |
| WO | WO2011019496 | 2/2011 |

OTHER PUBLICATIONS

European Application No. 10740077.2—Notice of Grant mailed Jun. 27, 2013.

Mexico Application No. MX/a/2012/001821—Office Action mailed Apr. 30, 2013.

PCT International Search Report, PCT Application No. PCT/US2010/043219, dated Oct. 18, 2010.

PCT Written Opinion of the International Searching Authority, PCT Application No. PCT/US2010/043219, dated Oct. 18, 2010.

PCT International Preliminary Report on Patentability, PCT Application No. PCT/US2010/043219, dated Feb. 14, 2012.

Chinese Application No. 201080042402.8—Notification of First Office Action dated May 15, 2013.

Korean Application No. 10-2012-7006253—Notice of Preliminary Rejection dated Jun. 7, 2013.

\* cited by examiner

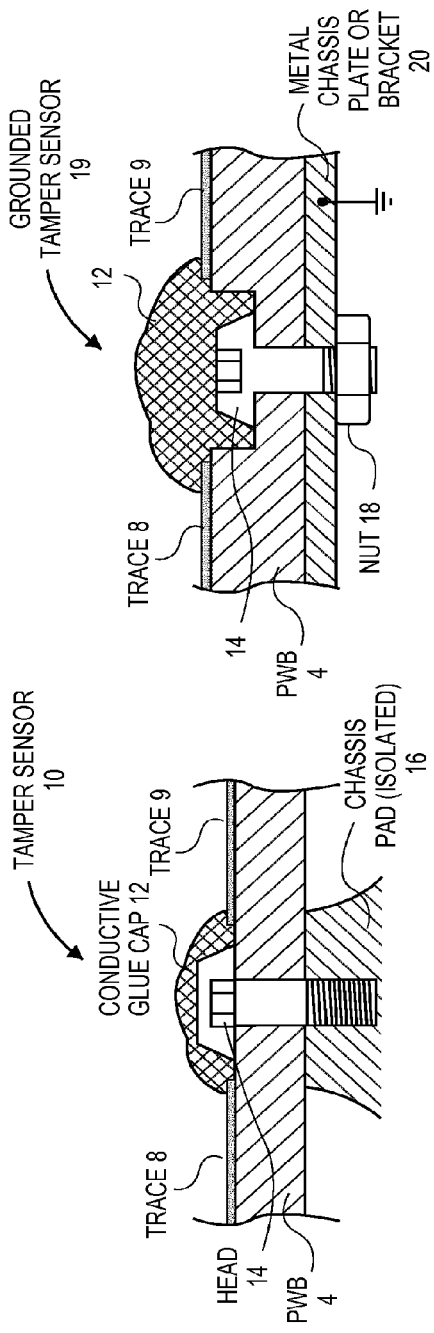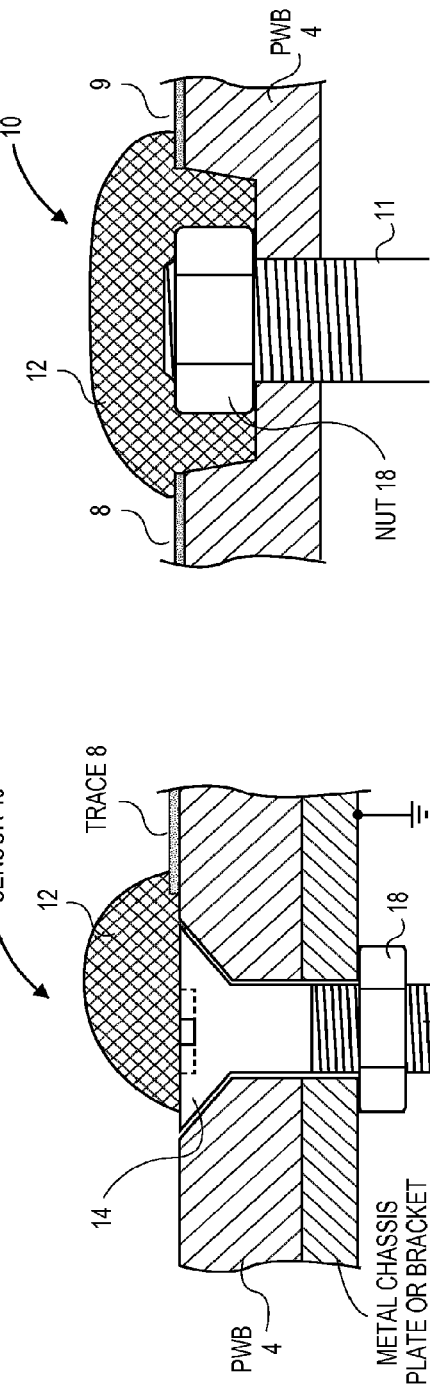

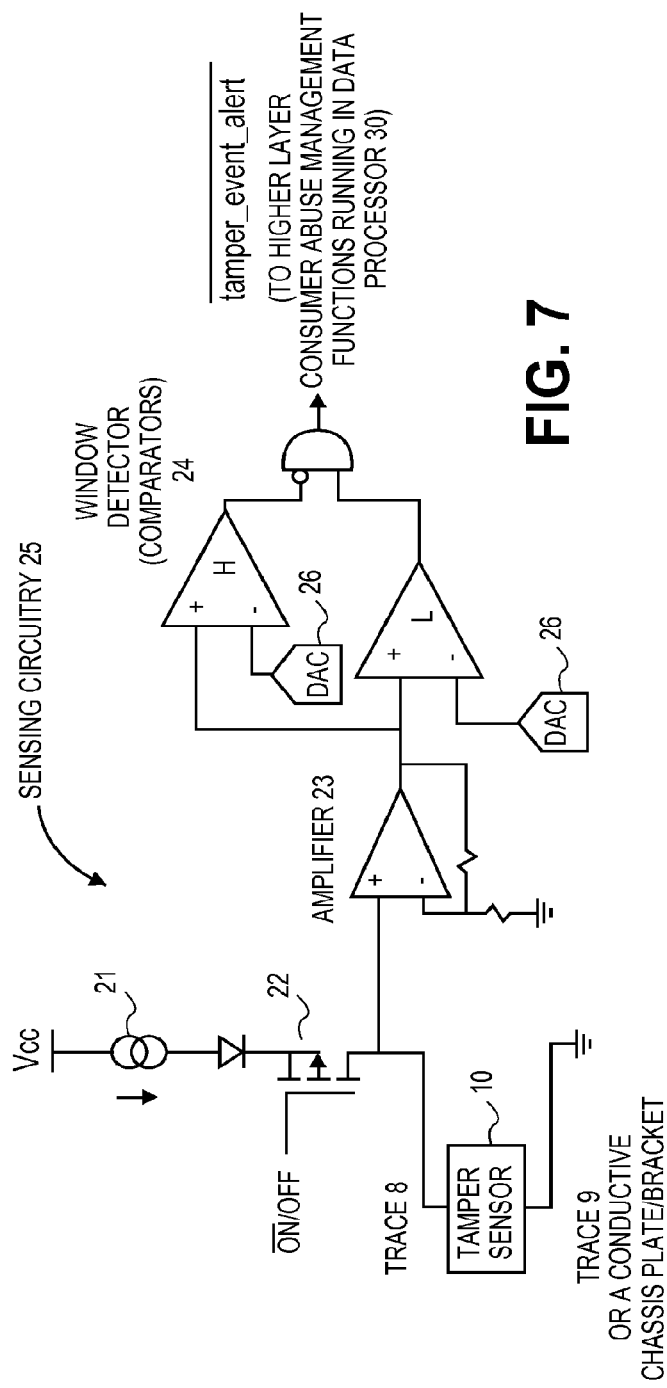
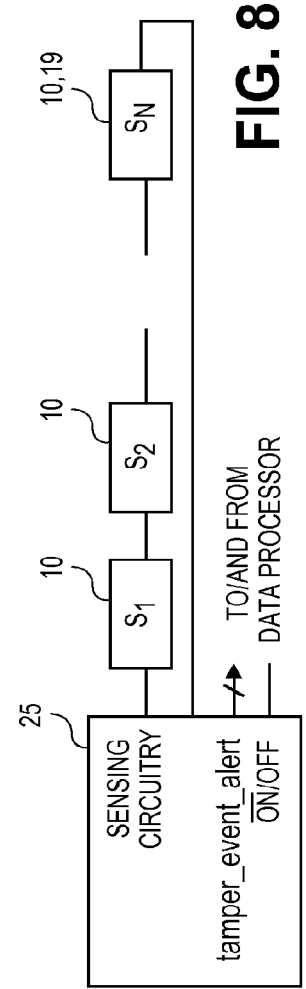

MECHANISMS FOR DETECTING TAMPERING OF AN ELECTRONIC DEVICE

CROSS REFERENCE TO RELATED APPLICATIONS

This application claims priority to U.S. Nonprovisional patent application Ser. No. 12/721,211, filed Mar. 10, 2010, entitled "MECHANISMS FOR DETECTING TAMPERING OF AN ELECTRONIC DEVICE," and to U.S. Provisional Patent Application No. 61/232,686 filed Aug. 10, 2009, entitled "MECHANISMS FOR DETECTING TAMPERING WITH A PRINTED CIRCUIT BOARD AND EXPOSURE TO WATER IN AN ELECTRONIC DEVICE" which are incorporated herein by reference in their entireties and for all purposes.

BACKGROUND

1. Field

The present invention relates generally to electronic devices and, more particularly, to techniques for detecting the occurrence of consumer abuse in electronic devices.

2. Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic products purchased by consumers are usually sold with a warranty or return policy accompanying the product in which the vendor and/or manufacturer warrants that the product is free from defects and will remain operable for at least a limited period of time. For example, typical warranty and return policies may specify that in the vent a defect is discovered in a product, or that the product becomes inoperable during the warranty period, the manufacturer or vendor will either replace the product or provide repair services to restore the product to an operational state at little or no additional charge to the consumer.

In general, such warranty and return policies are intended only to cover failures and defects relating to the manufacture or design of the product, and typically do not cover product failure that occurs as the result of consumer abuse. In fact, many warranty policies explicitly exclude returns or repair when damage from consumer abuse, whether intentional or unintentional, is the underlying cause of the product failure. For example, consumer abuse may include exposing an electronic device to liquids, extreme temperatures, or excessive shock (e.g., the resulting impact from dropping the device). Consumer abuse may also result from tampering which may include any interaction with the device that is not related to operating the device in a normal manner (e.g., opening the casing or housing of a device and adding, removing, or altering the internal components).

Electronic devices such as desktop personal computers, laptop or notebook computers, smartphones, and portable digital media players are often tampered with by the end user or consumer. For example, some users would like to test their do-it-yourself abilities and attempt to repair or improve the performance of an electronic device by opening its exterior housing and attempting to remove or modify electronic components inside, such as a printed wiring board or printed circuit board (PCB).

Inevitably, a percentage of products sold will eventually malfunction or become inoperable at some point during the product's lifetime. When this occurs, and if the product is still within the warranty period, the purchasing consumer may elect to return the failing or inoperable device to the vendor at the point of sale or directly to the manufacturer for either service or replacement in accordance with the terms of the warranty agreement.

However, a problem arises when a device has failed due to consumer abuse which may not be readily apparent upon a cursory inspection, but a consumer attempts to return the device for repair or replacement under the warranty. Often, particularly at a point of sale, personnel receiving the returned device may be unqualified or untrained to determine whether or not a device has failed due to manufacturing defects or due to consumer abuse. Thus, personnel at the point of sale may often times exchange the returned product with a working replacement product regardless of the cause of failure in order to avoid potential conflicts with the customer. As a result, it is not uncommon for consumers to receive replacement products or repair services on abused products not covered under the terms of a warranty. Such erroneous replacements or repairs may be costly to the vendor and/or manufacturer of the product.

SUMMARY

It would be desirable to detect consumer abuse (generally referred to here as tampering) without having to rely upon the explanatory statements of the user who may be returning a unit that is no longer working according to the original specification of the manufacturer. An embodiment of the invention is a tamper sensor mechanism, which may be used to automatically detect an attempt to remove a printed wiring board (PWB) or PCB from an electronic device. This mechanism could replace a typical solution for tamper or intrusion detection, namely an adhesive label or sticker that is often placed on the PCB and covers a fastener that secures the PCB to a housing or chassis of the device. Several embodiments of the invention are now described.

In one embodiment, the PWB has formed therein a tamper sensor composed of a pair of conductive (circuit) traces, and a cap being an amount of conductive glue that covers a part of the fastener and, by virtue of being a fluid, fills an air gap (electrically insulating) between the two traces to thereby form a conductive path that connects the two traces. A sensing circuit is provided that is coupled to the pair of traces, to detect a change in impedance of the path. When the detected change in impedance is found to be sufficient to indicate that an attempt was made to remove the fastener (or in fact the fastener was removed), the sensing circuit responds by signaling an alert to a data processor that logs a tamper event data structure in the electronic device, indicating that an attempt was made to unsecure the PWB from the chassis.

In another embodiment, a single circuit trace is sufficient adjacent the fastener hole (to form the tamper sensor). A cap being a measured amount of conductive glue is deposited in contact with and covering a tool end of the fastener that is installed in the hole. The cap fills an electrically insulating gap between the circuit trace and the tool end to thereby form a conductive path that connects the circuit trace to a conductive portion of the chassis via the fastener. In this embodiment, the fastener may act as part of the conductive path whose impedance is monitored (by the sensing circuit) for any changes.

Where more than one tamper sensor is desired (e.g., when multiple fasteners are needed to secure the PWB to the chassis), the pairs of circuit traces associated with each hole may be connected to each other in series. The sensing circuit is then coupled to detect any change in the impedance of the entire conductive path that runs through all of the series-connected tamper sensors. Thus, with each tamper sensor being "normally shorted" (or exhibiting "continuity") in its untampered state, tampering with any one of the sensors results in an "open" circuit that is detected by the sensing circuitry as a threshold change in impedance.

In some cases, the electronic device may be relatively large or complex with a multi piece PWB or simply with a PWB that has a relatively large number of tamper sensors. In that case, a selection and sensing circuit is provided that is coupled to the relatively large number of tamper sensors in the form of a randomly accessible sensor "array". Though not necessarily rectangular, this embodiment can be viewed as having "column" and "row" sensor select signals that are asserted by the selection and sensing circuit, in order to pass a current through or apply voltage to any one of the respective conductive paths of the tamper sensors at a time, and then detect a change in impedance therein. The sensor array may thus be "scanned" periodically, looking for any tamper event alerts. In doing so, the physical location of any tamper event can be inherently identified by the selected row and column select signals.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 3 is a cross-section of one instance of the tamper sensor.

FIG. 4 is a cross-section of another instance of the tamper sensor, in this case a grounded tamper sensor.

FIG. 5 is another instance of a grounded tamper sensor.

FIG. 6 shows another instance of the tamper sensor, having a different fastener tool end.

FIG. 7 is a circuit diagram of an example implementation of the sensing circuitry.

FIG. 8 shows a series connection of multiple tamper sensors.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
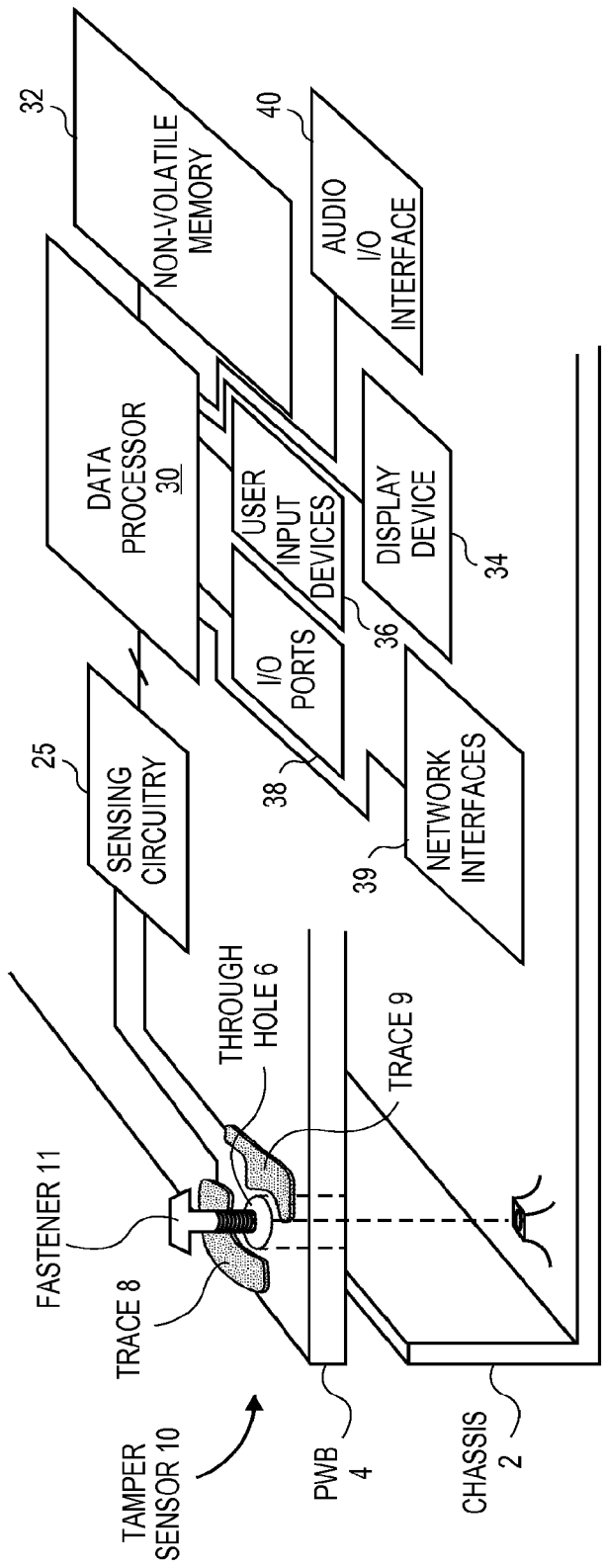
FIG. 1 is a perspective or elevation view of the opened chassis of an electronic device showing a tamper sensor mechanism.

FIG. 1 is a perspective or elevation view of the inside of the housing of an electronic device, showing an opened chassis with a tamper sensor mechanism in accordance with an embodiment of the invention. The electronic device may be a desktop computer, a notebook/laptop computer, a personal digital assistant, a tablet computer, a smart phone, or any other consumer electronics device that is likely to be tampered with by an end user or consumer.

Figure 2:
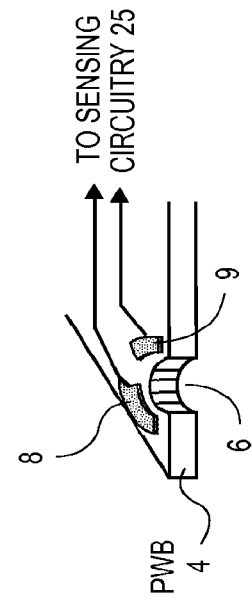
FIG. 2 shows an alternative arrangement for the hole in the PWB, as used in the tamper sensor mechanism.

The device contains a data processor 30 which may be any conventional programmable microprocessor-based (or hard-wired state-machine based) circuitry that uses non-volatile memory 32 to perform various typical functions (e.g., general purpose computing, desktop computer applications, mobile applications including wireless telephony and wireless Internet access, and multimedia recording and playback, e.g. video and audio). These functions are performed using the following hardware components that are typical of, for example, a smart phone: I/O ports 38 (e.g., serial computer peripheral communications bus), user input devices 36 (e.g., keyboard, mouse, and touch sensitive panels), display device 34 (e.g., a liquid crystal display panel), audio I/O interface 40 (e.g., microphones and speakers), and network interfaces 39 (e.g., network interface controllers for Ethernet and wireless local area network protocols, and mobile telecommunications and cellular telecommunications transceiver circuitry). Most of these components may be installed (wired together) in a PWB 4 (also referred to as a printed circuit board, PCB). The PWB 4 may have two or more segments that are connected to each other by a flex connector, for example. The device has a chassis 2 to which the PWB 4 having a through hole 6 is secured, using a fastener 11 that is installed in the hole. The chassis 2 may be a separate metal frame or bracket inside an external housing of the device, or it may be part of the external housing itself (e.g., a plastic frame or support member having a chassis pad to which the fastener 11 may be affixed). The through hole 6 may be located inward of the boundary of the PWB 4 as shown in FIG. 1; alternatively, it may be right at the boundary or edge as depicted in FIG. 2. The fastener 11 may be a screw, a nut and bolt combination, or other suitable alternative that can secure the PWB to the chassis through the hole 6. Several possibilities for a screw-type fastener and how it secures the PWB to the chassis are shown in FIGS. 3-6 to be described below.

The PWB 4 has formed therein a pair of conductive traces also referred to as circuit traces 8, 9, adjacent or near the hole 6. These may also be described as conductive pads; they may be specifically engineered, in terms of their shape and size, for their purpose as part of a tamper sensor 10 that will also include a conductive glue cap 12. The latter may be a measured amount of conductive glue that covers at least a part of the fastener 11 and fills an electrically insulating gap between the two traces 8, 9 to complete a conductive path—see FIGS. 3-6. A sensing circuit 25, which may be assembled or installed onto the PWB 4 or otherwise present inside the housing of the electronic device, is coupled to the pair of traces 8, 9, to detect a change in impedance of the tamper sensor 10, and in particular the conductive path through the cap 12 that connects the two traces 8, 9.

As seen in FIGS. 3-6, the conductive glue cap 12 may cover a tool end of the fastener 11 so that to unsecure the PWB 4 from the chassis, disruption or removal of a part of the cap 12 is required, before a tool can engage the tool end of the fastener 11 and remove or sufficiently loosen the fastener 11, to enable removal or unsecuring of the PWB 4. The cap 12 is in contact with the tool end so as to fill at least a part of an opening, or cover a corner in the tool end, so that a tool such as a screwdriver cannot engage the fastener. For example, a user would have to first break off at least a portion of the cap 12, before he can engage the keyed top surface of the tool end of the fastener 11 with the correct wrench (and before being able to rotate or otherwise actuate the wrench to thereby rotate or otherwise disengage the fastener from the chassis 2). This disruption of the cap 12 may change the impedance of the conductive path that connects the two traces 8, 9, where such change may be detected by the sensing circuitry 25. In one embodiment, the impedance should increase sufficiently when the cap 12 is so disrupted, even though the user might not want to or be able to subsequently disengage the fastener from the chassis. In another embodiment, the required disruption of the cap 12 (sufficient to be detected as a "tamper event") does not occur until the tool end of the fastener has been loosened so as to allow the PWB 4 to be removed, or the tool end has been removed from the chassis. The shape and size of the cap 12 as well as its material (and conductivity) should be selected such that disengaging the fastener (by first disrupting the cap 12) is likely to cause a sufficient impedance change that can be detected by the sensing circuitry 25.

Returning to FIG. 1, when the sensing circuitry 25 has detected a change in impedance of the conductive path that connects the traces 8, 9, it may in response signal a tamper event alert to the data processor 30 in the electronic device 10. The data processor 30 in turn may evaluate and log a tamper event in non-volatile memory 32, by creating a data structure of the tamper event that identifies the tamper sensor (if there is more than one in the PWB 4) and perhaps the time and date of the event, and may then disable operations of the device. For instance, all operations of the device may be disabled in response to receiving the tamper event alert, except for a message that is displayed instructing the user to return the device to its manufacturer for service. Additional details regarding such higher layer consumer abuse management functions that may be performed by the data processor 30 are given in U.S. Patent Application Publication No. 2009/0195394, filed Feb. 1, 2008, entitled "Consumer Abuse Detection System and Method".

Turning now to FIG. 3, a cross-section of one instance of the tamper sensor 10 is shown. In this embodiment, a tool end of the fastener (referred to as head 14) is above a surface of the PWB 4 in which the pair of conductive traces 8, 9 are formed. Note the latter in most instances are likely to be formed in the same plane of the PWB 4, that is, in the same metal layer, and in particular the top most metal layer. However, as discussed below in connection with FIG. 6, one alternative is to form at least one of the traces 8, 9 in a lower metal layer (below the top most surface of the PWB 4).

Still referring to FIG. 3, the conductive glue cap 12, as shown, is in contact with the top surface of the tool end of the fastener. In this case, the conductive glue fills a sufficient part of an opening, or covers at least a corner in the tool end of the fastener, so that a tool or wrench cannot engage the fastener (without the cap 12 being disrupted). The fastener in this instance is a hex head bolt or screw that has been threaded into a chassis pad 16 of the chassis, and in doing so has secured the PWB 4 to the top of the chassis pad 16 as shown.

The conductive glue cap 12 also electrically connects with the traces 8, 9, so as to provide a conductive path between them. The measured amount of conductive glue may be that amount which is sufficient to flow within and fill the gap between the traces 8, 9 and provide a sufficiently thick barrier over the tool end of the fastener, so as to prevent a tool or wrench from being used to disengage the fastener. In practice, the conductive glue cap 12 may be the result of a measured amount of conductive glue that is deposited in fluid form at approximately the center of the fastener head 14 and then allowed to settle or spread over the head and come into contact with the traces 8, 9. This measured amount of conductive glue is then allowed to cure or harden into the final shape depicted, so that it must be broken apart in order to allow the tool end of the fastener to be engaged by a wrench or other tool.

FIG. 4 is a cross-section of another instance of the tamper sensor 10, in this case a grounded tamper sensor 19. The fastener 11 in this case is a conductive bolt, so that it forms a conductive path to a conductive portion of the chassis that is also grounded. More specifically, a metal screw is shown that has been secured to a metal chassis plate or bracket 20 below the PWB 4, by a nut 18 that has been threaded onto the open end of the bolt. Note also that in this case, the head 14 of the fastener 11 is recessed, lower into the PWB 4, such that as installed, the head 14 is below a top most surface of the PWB outside the hole. In addition, the conductive glue cap now also fills a part of the PWB recess in which the head 14 is installed.

Turning now to FIG. 5, another instance of a grounded tamper sensor 19 is depicted, this time using a single trace 8 and not trace 9, to connect with the conductive path provided by the conductive glue cap 12. In this embodiment, as in that of FIG. 4, the fastener is conductive. In particular its head 14 is conductive, such that when the glue cap 12 has been deposited in contact with the trace 8 and with the head 14, a conductive path connects the circuit trace 8 to the chassis' conductive portion (in this case a metal chassis plate or bracket 20 that is also grounded) via the fastener body. The sensing circuit 25 (not shown) is coupled to the single trace 8, but also to the metal chassis plate or bracket 20 through the ground connection (e.g., a PWB ground plane). This enables the sensing circuit 25 to detect a change in impedance of the conductive path in much the same manner as in the "floating" tamper sensor 10 of FIG. 3, except that the tamper sensor 19 is grounded, whereas tamper sensor 10, depictive in FIG. 3 need not be.

It should also be noted that while FIGS. 4 and 5 depict a tamper sensor 19 that is grounded by virtue of grounding the chassis plate or bracket 20, an alternative is to float the metal chassis plate or bracket 20 above ground. In that case, the sensing circuitry 25 would still need to have a connection to the chassis plate or bracket 20 to be able to sense the impedance of the sensor 19, but such a connection is not grounded in that case.

FIG. 6 depicts yet another instance of the tamper sensor 10, where in this case, the tool end of the fastener 11 is the open threaded end of a screw on which a nut 18 has been installed to secure the PWB 4. This embodiment is also similar to the one in FIG. 4 in that the tool end of the fastener rests within a cutout or indentation or recess in the topmost surface of the PWB 4. In this embodiment as in others, the conductive glue cap 12 is in contact with and thereby provides a conductive path between trace 8 and trace 9, and where the impedance of this path is substantially changed (namely, increased when attempting to remove the nut 18 from the fastener 11 (to remove the PWB from the chassis). Note that as an alternative to have the traces 8, 9 formed in the top most metal layer of the PWB 4, one or both of the traces 8, 9 in this embodiment may be "buried" in a lower metal layer of the PWB 4 that is exposed on the top surface of the recess (next to but spaced from the nut 18, to create the insulating gap between them which is filled by the conductive glue cap 12).

Turning now to FIG. 7, a circuit schematic of an embodiment of the sensing circuitry 25 is shown. The sensing circuitry 25 receives as input a control signal on/off that controls a transistor switch 22 to activate the tamper sensor 10 by applying a voltage or current from a known current source 21. Note in this example, the tamper sensor 10 need not be grounded but may be of the floating type. Alternatively, a grounded tamper sensor 19 may be used. An amplifier 23 is configured with some voltage gain, to measure the voltage developed across the tamper sensor 10 (when the switch 22 is turned on). A measure of the impedance of the tamper sensor 10 is then taken, using a window detector 24 that includes a low comparator and a high comparator. The thresholds for each comparator may be programmable, using a digital to analog converter (DAC) 26. When the detector 24 indicates that the voltage measured across the tamper sensor 10 falls outside of the predefined window, that is either lower than the threshold of the low comparator or higher than the threshold of the high comparator, a tamper event alert signal is asserted, at the output of the sensing circuitry 25. This alert signal is provided to higher layer consumer abuse management functions that may be running in the data processor 30—see FIG. 1.

For instance, at the design or testing stage, a given voltage range or window is determined for the tamper sensor 10 in its untampered state, by testing or simulating several activated tamper sensors 10, to select the voltage range (or equivalently, impedance range) that is considered to be the untampered state of the tamper sensor 10. The window, of course, depends on the design of the tamper sensor 10 including, in particular, the conductivity of the conductive glue cap 12. The window may be determined based on experimental analysis of a sample tamper sensor 10, in both the untampered state and then in a tampered or disrupted state. Statistical data may be taken from several samples of the tamper sensor 10, and several instances of disrupted or tampered states, to select a "best fit" window that defines the untampered condition. This defined window may then be stored in non-volatile memory 32 (see FIG. 1), such that the data processor 30, while running the appropriate software, can access this defined window from the memory 32 and program the pair of DACs 26 accordingly, so as to initialize the thresholds of the window detector 24 for operation. As an alternative, the window thresholds may be hard-wired at the time of manufacture and assembly of the PWB 4.

The window determination process may be used to help select the amount and/or type of material for the conductive glue cap 12, so that, for example, its resistance falls within a narrow window. For instance, the conductivity of the cap 12 may be designed to be in a narrow range (window) that is substantially less than that of a pure conductor such as copper.

Still referring to the sensing circuitry 25 in FIG. 7, the current source 21 may be programmable with several discrete dc current levels (e.g., 10 mA, 100 mA, and 250 mA). This would allow the data processor 30 to further customize the sensing circuitry 25 for a particular portable device, having a particular tamper sensor 10. As to the power supply (Vcc), this may be obtained from a battery in the portable device or it may be another "always-on" power source rail. Note that a protection diode may be included in series between the power source rail and the transistor switch 22. Also, the gain of the amplifier 23 may be programmable (under command of the data processor 30 for instance), in order to support different types of tamper sensors. It should be noted that while the window detector 24 is shown as a pair of comparators, an alternative may be to use a single comparator, for a less precise or broader definition of the untampered state. For instance, a single comparator may be used with a single threshold voltage, so that the untampered state is defined as any voltage at the output of the amplifier 23 that is below that threshold (where in the tampered state, the voltage across the tamper sensor 10 increases above that threshold).

Turning now to FIG. 8, a series connection of multiple tamper sensors is shown. Each of the sensors $S_1, S_2, \ldots SN$ may be deemed to have a low resistance (referred to here generically as "shorted" or "normally shorted"), until the user has tampered with any one of them. When any one of the N sensors is tampered with, a high resistance condition (or generically referred to here as "open circuit") is created in the series branch, which is then detected by the sensing circuitry 25 as an increased voltage across the sensors (see FIG. 7). This allows multiple fasteners that may be required to secure the PWB 4, to be protected in this way, while saving the number of pins in the electronic device that are needed for implementing such an intrusion detection function. In other words, rather than having a separate sensing circuit 25 for each individual sensor $S_1, S_2 \ldots$, a single window detector 24 as in FIG. 7 may be shared by N series connected sensors.

Figure 9:
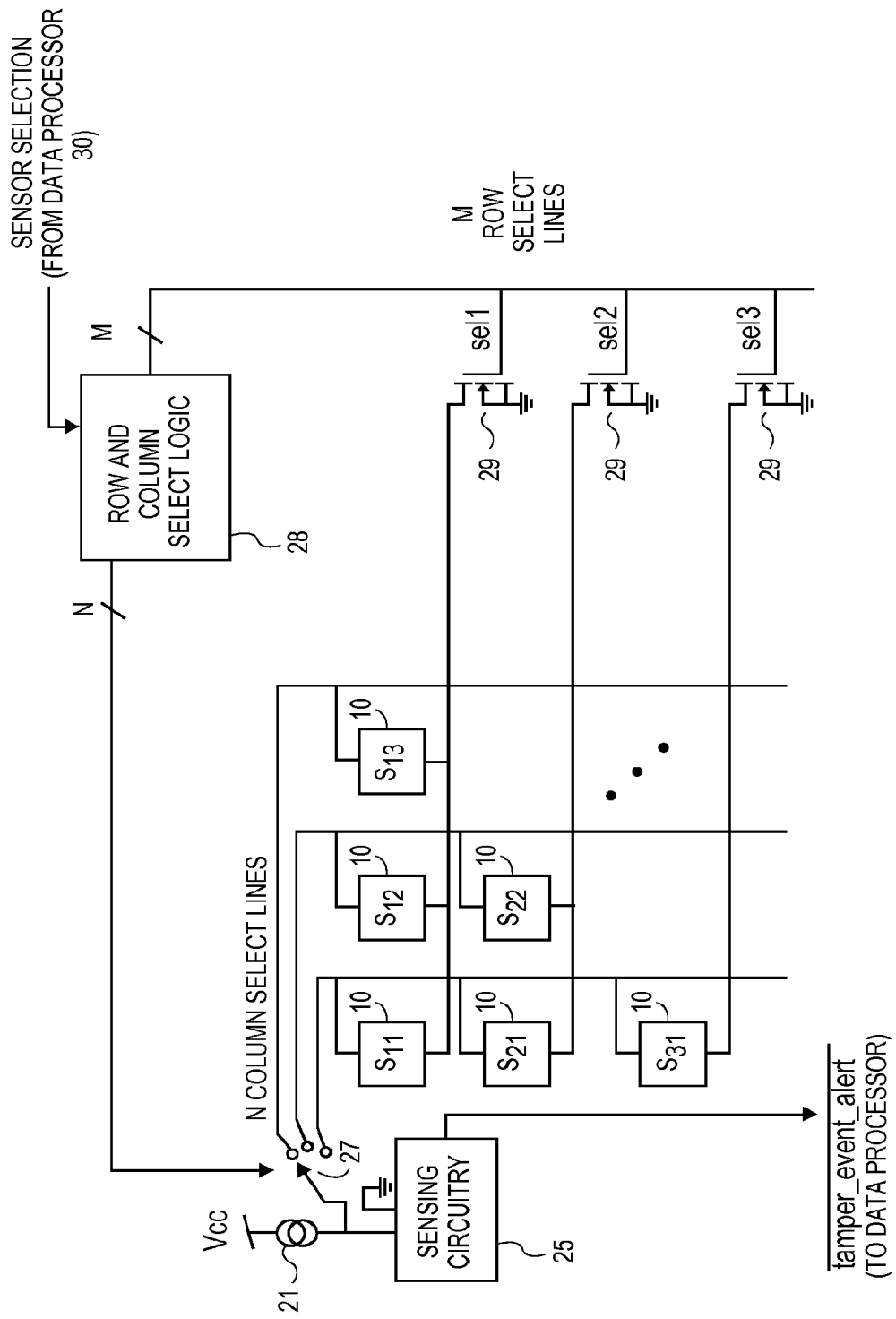
FIG. 9 shows an array of tamper sensors coupled to selection logic and sensing circuitry.

Turning now to FIG. 9, another multi-sensor arrangement is shown that is also effective in reducing pin count. Here, an "array" of tamper sensors $S_{11}, S_{12}, \ldots S_{MN}$ are shown, where there are M×N sensors in the array. This so called array or matrix arrangement is also referred to as a scanned sensor embodiment, in which individual column select and row select lines are connected to the array of sensors $S_{ij}$, to yield a randomly accessible sensor array. In addition to providing lower pin count, such an arrangement also allows isolation of any desired individual sensor $S_{ij}$ to pinpoint a fault (tamper event), as well as a reduction in power consumption since only a single sensor need be turned on or activated at any given moment. For instance, to activate sensor $S_{22}$, only row select line 2 and only column select line 2 would be activated, thereby enabling the current source 21 to force a current through only that sensor. In this case, each sensor is an instance of the tamper sensor 10, 19 that is normally shorted in its untampered state. The condition detection or sensing circuitry 25 is connected to a particular column select line through a switch or multiplexer 27 as shown, thereby enabling it to detect the condition of any one of the sensors of the array as commanded by the row and column select logic 28. A single sensor can be selected by having only the transistor switch 29 of that row turned on. The row and column select logic 28 decodes a sensor selection received from the data processor 30, into the appropriate column and row select lines to be activated. Note that in this embodiment, the row select lines are relatively high impedance lines that are connected to the gates or control electrodes of respective transistor switches 29, whereas the column select lines would be switched to the current source 21 for activating or driving a given sensor. The designation of "column" and "row" is only used to distinguish between those two types of select lines and is not otherwise intended to limit the arrangement of the randomly accessible sensor array.

Figure 10:
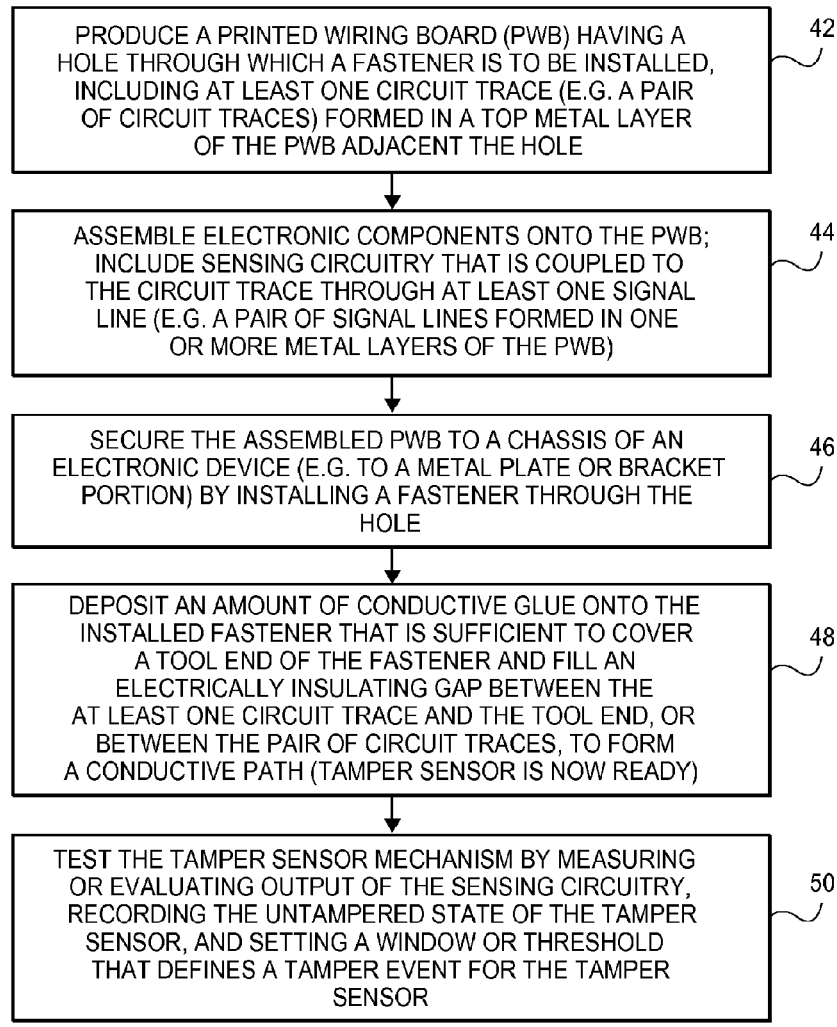
FIG. 10 is a flow diagram of a manufacturing and production test process for tamper sensor mechanisms.

A flow diagram of a manufacturing and production test process for a tamper sensor mechanism is described in FIG. 10. Operation begins in block 42 where a PWB having a hole through which a fastener is to be installed is produced. The PWB includes at least one circuit trace (e.g., a pair of circuit traces) formed in a top metal layer of the PWB, adjacent to the hole. As an alternative, the circuit trace may be formed in a buried metal layer of the PWB. Next, electronic components (such as packaged integrated circuits, connectors, and discrete circuit devices) are assembled onto (e.g., soldered to) the PWB. These components may include sensing circuitry that is coupled to the circuit trace through at least one signal line (e.g., a pair of signal lines formed in one or more metal layers of the PWB). Operation then proceeds with securing the assembled PWB to a chassis of an electronic device (block 46). For example, the PWB may be secured to a metal or plastic plate or a bracket portion of the chassis. This is achieved by installing a fastener through the hole, to secure the PWB to the chassis. Next, an amount of conductive glue is deposited onto the installed fastener, where this amount is sufficient to cover at least a part of a tool end of the fastener so as to prevent access to the fastener (unless the conductive glue is substantially disrupted). The deposited conductive glue is then allowed to flow into and fill an air gap between the at least one circuit trace and the tool end, or between a pair of circuit traces, to thereby form a conductive path of a tamper sensor. The deposited conductive glue is fluid and may therefore conform to the shape of tool end as it flows and spreads in the gap; it may then be allowed to cure and harden, before being tested. The tamper sensor mechanism may be tested by measuring or evaluating output of the associated sensing circuitry (block 50). In particular, the untampered state of the tamper sensor may be recorded and verified as falling within a predefined window (or above a given threshold voltage). This window or threshold which defines a tamper event for the sensor may have been hard-wired into the sensing circuitry or it may be written to non-volatile memory installed on the PWB. The assembled PWB may now be deemed to have passed this aspect of the production test.

Figure 11:
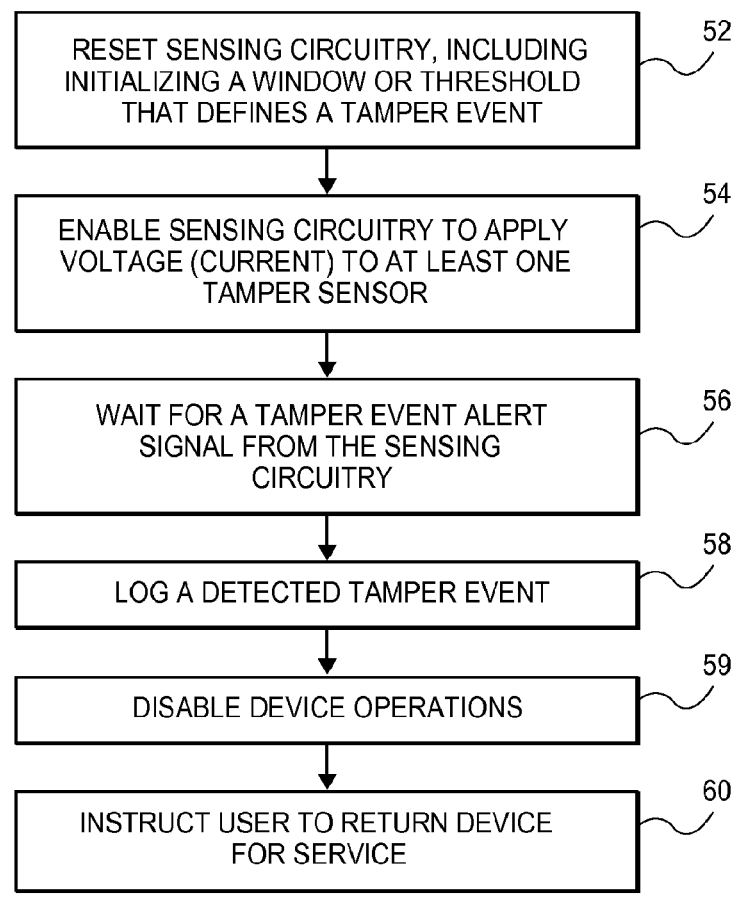
FIG. 11 is a flow diagram of a tamper detection process in an electronic device.

Turning now to FIG. 11, a flow diagram of a tamper detection process running in an electronic device is shown. The process begins in operation 52 with the sensing circuitry being reset, including initializing a window or threshold that defines a tamper event. Note that as an alternative, the window or threshold defining the tamper event may have been hard-wired into the sensing circuitry. Next, the sensing circuitry is enabled or activated, to apply a voltage (current) to at least one tamper sensor that is coupled to it (block 54). This may be done by a data processor asserting the on/off signal to the sensing circuitry 25 of FIG. 7 described above. Next, the data processor waits for a tamper event alert signal from the sensing circuitry (block 56). It should be noted that this reference to the data processor "waiting" for the tamper event alert signal encompasses both the situation where the processor is polling the sensing circuitry as well as when it is being interrupted by the alert. When the tamper event alert is received following block 56, the data processor logs a detected tamper event (block 58). The latter may include identifying the sensor for which the tamper alert has been received, and storing this identification together with a time and date stamp associated with the alert. The logged tamper event may be stored in a non-volatile memory inside the electronic device. Next, certain device operations may be disabled (block 59) and an instruction may be displayed or given to the user of the electronic device to return the device for service (block 60).

Once the device has been returned to the manufacturer, the logged tamper event may be read and the tampered sensor may be inspected to confirm that the electronic device was in fact tampered with by its user.

Figure 12:
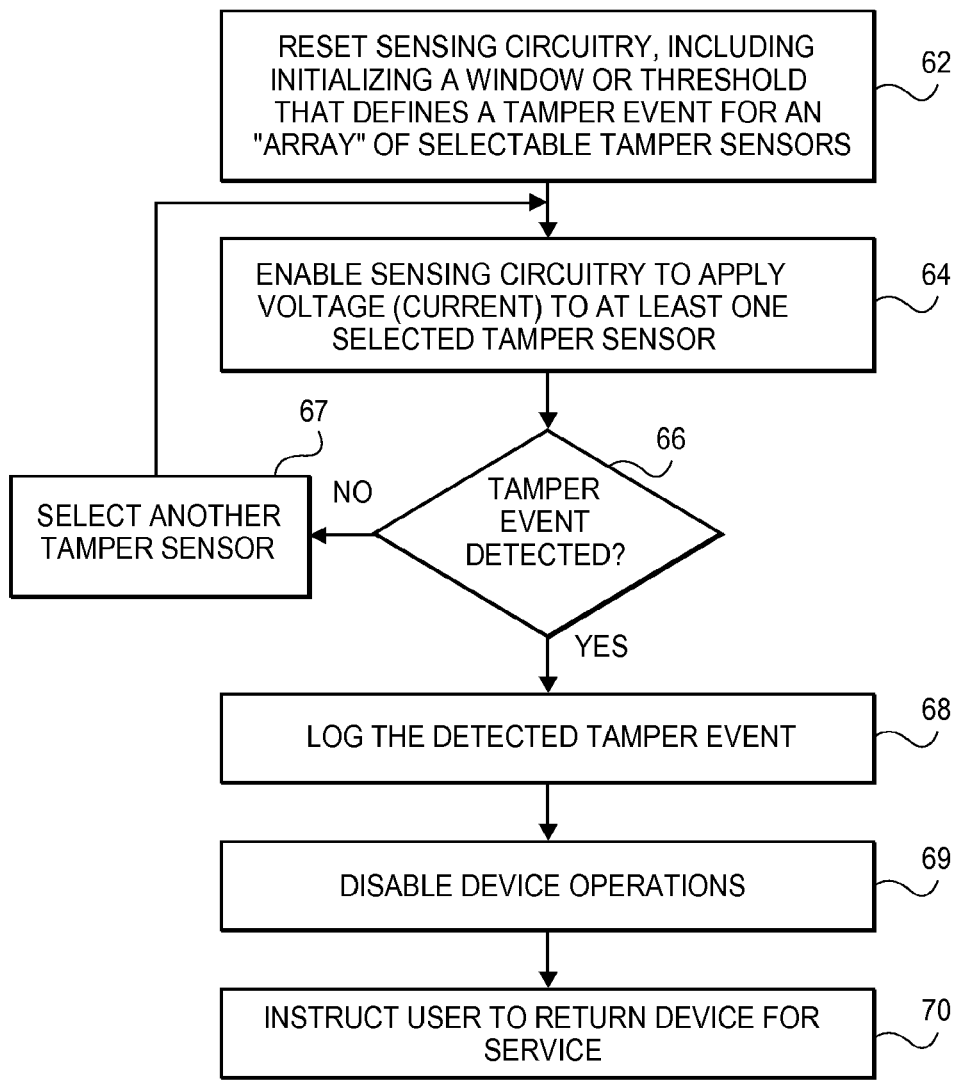
FIG. 12 is a flow diagram of another tamper detection process in the electronic device, involving a selectable sensor array.

FIG. 12 is a flow diagram of another tamper detection process in the electronic device, this time involving a selectable or randomly accessible sensor array. Operation begins with block 62 in which the sensing circuitry is reset, including initializing a window or threshold that defines a tamper event for an array of selectable tamper sensors integrated in the electronic device. Note that each tamper sensor may be associated with a different window or threshold, provided that the sensing circuitry is capable of being reconfigured or programmed for each such different window or threshold. Operation then continues with block 64 in which the sensing circuitry is enabled, to apply voltage (current) to at least one selected tamper sensor. For instance, in the embodiment of FIG. 9, this is achieved by sending a sensor selection command from the data processor 30 to the row and column select logic 28, where the latter in response decodes the requested selection into the appropriate pair of column and row select lines to be activated or asserted. This causes the sensing circuitry 25 to then be connected to a particular sensor in the array. If a tamper event is detected at that point (block 66), then the sensing circuitry asserts its tamper event alert signal to the data processor, in response to which the data processor logs the detected tamper event as being associated with the selected sensor (block 68). If no tamper event is detected by the sensing circuitry 25, then the data processor, recognizing this, selects another tamper sensor (block 67). This is achieved by sending another sensor selection command to the row and column select logic 28. The array may thus be scanned in this manner, until a tamper event is detected and logged in block 68. Thereafter, device operations may be disabled in response to a detected tamper event (block 69), and the user may be instructed to return the device for service (in block 70).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the fastener 11 depicted in the drawings is of a threaded type, the fastener may alternatively be of a different type or other tool (that still requires a wrench to disengage it from the chassis), e.g. a rivet; a spring-loaded quarter turn plunger. The description is thus to be regarded as illustrative instead of limiting.

What is claimed is:

1. An electronic device, comprising:
    a chassis;
    a printed wiring board (PWB) secured to the chassis by a fastener, the PWB having a pair of conductive traces, and a conductive cap filling electrically insulating gaps between the pair of conductive traces and the fastener to thereby form a conductive path that connects the two traces; and
    a sensing circuit coupled to the pair of conductive traces and configured to:
    detect a change in impedance of the path, and, in response, signal an alert to a data processor that evaluates and logs tamper events in the electronic device.

2. The electronic device of claim 1, wherein, as installed, a tool end of the fastener is below a surface of the PWB.

3. The electronic device of claim 2, wherein the conductive cap is in contact with said end of the fastener.

4. The electronic device of claim 2, wherein the pair of conductive traces is formed in the same plane of the PWB and above said end of the fastener.

5. The electronic device of claim 1, wherein, as installed, a tool end of the fastener is above a surface of the PWB in which the pair of conductive traces is formed, and the conductive cap is in contact with said end of the fastener.

6. The electronic device of claim 1, further comprising:
another fastener that secures the PWB to the chassis, the PWB having a further pair of conductive traces, and a further conductive cap filling electrically insulating gaps between the another fastener and each of the respective further traces to thereby form a further conductive path that connects the further pair of conductive traces,
the sensing coupled to the further pair of conductive traces and configured to detect changes in impedance of the further path, wherein said path and said further path are connected to each other in series.

7. An electronic device comprising:
a chassis;
a printed wiring board (PWB) secured to the chassis by a plurality of fasteners,
wherein, for each fastener, hole the PWB has a respective pair of conductive traces and a respective conductive cap filling electrically insulating gaps between each fastener and each of the respective pair of conductive traces to thereby form a respective conductive path that connects with the respective pair of conductive traces, said respective conductive paths being coupled to each other in series; and
a sensing circuit coupled to said respective conductive paths and configured to:
detect a change in impedance therein and in response signal an alert to a data processor that evaluates and logs tamper events in the electronic device.

8. The electronic device of claim 7, wherein the sensing circuit is coupled to the respective conductive paths at only two nodes.

9. The electronic device of claim 7, wherein, as installed, a tool end of each fastener is below a surface of the PWB.

10. The electronic device of claim 9, wherein the conductive cap is in contact with said tool end of each fastener.

11. The electronic device of claim 9, wherein each pair of conductive traces is formed in the same plane of the PWB and above said tool end of each fastener.

12. The electronic device of claim 7, wherein as installed, a tool end of each fastener is above a surface of the PWB in which each pair of conductive traces is formed, and the conductive cap is in contact with said tool end of each fastener.

13. An electronic device comprising:
a chassis;
a printed wiring board (PWB) secured to the chassis by a plurality of fasteners,
wherein, for each fastener, the PWB has a respective pair of conductive traces and a respective conductive cap filling electrically insulating gaps between each fastener and each of the respective pair of conductive traces to thereby form a respective conductive path with the respective pair of conductive traces, said respective conductive paths being connected as a randomly accessible sensor array; and
a selection and sensing circuit coupled to said randomly accessible sensor array, to pass a current through any one of the respective conductive paths at a time and then detect a change in impedance therein, the selection and sensing circuit configured to, in response to detecting the change in impedance, signal an alert to a data processor that evaluates and logs tamper events in the electronic device, wherein the alert identifies said one of the respective conductive paths in which the impedance change was detected.

14. The electronic device of claim 13, wherein, as installed, a tool end of each fastener is below a surface of the PWB.

15. The electronic device of claim 14, wherein the conductive cap is in contact with said tool end of each fastener.

16. The electronic device of claim 14, wherein each pair of conductive traces is formed in the same plane of the PWB and above said tool end of each fastener.

17. The electronic device of claim 13, wherein as installed, a tool end of each fastener is above a surface of the PWB in which each pair of conductive traces is formed, and the conductive cap is in contact with said tool end of each fastener.

* * * * *

UNITED STATES PATENT AND TRADEMARK OFFICE
CERTIFICATE OF CORRECTION

PATENT NO.       : 8,736,286 B2                          Page 1 of 1
APPLICATION NO.  : 13/602017
DATED            : May 27, 2014
INVENTOR(S)      : Timothy M. Johnson et al.

It is certified that error appears in the above-identified patent and that said Letters Patent is hereby corrected as shown below:

In the Claims:

Column 10, line 67 (Claim 3, line 2): "cap is" should read --cap filling is--.

Column 11, lines 6-7 (Claim 5, lines 3-4): "cap is" should read --cap filling is--.

Column 11, line 42 (Claim 10, line 2): "cap is" should read --cap filling is--.

Column 12, line 7 (Claim 12, line 4): "cap is" should read --cap filling is--.

Column 12, line 33 (Claim 15, line 2): "cap is" should read --cap filling is--.

Column 12, line 40 (Claim 17, line 4): "cap is" should read --cap filling is--.

Signed and Sealed this
Thirtieth Day of September, 2014

Michelle K. Lee
*Deputy Director of the United States Patent and Trademark Office*